United States Patent

Wu

[11] Patent Number: 5,926,545
[45] Date of Patent: Jul. 20, 1999

[54] BATTERY HOLDER

[76] Inventor: Cheng-Yi Wu, 2Fl. No. 41, Lane 152, Chung Ping Rd., Hsin Chuang City, Taipei Hsien, Taiwan

[21] Appl. No.: 08/987,420

[22] Filed: Dec. 9, 1997

[51] Int. Cl.[6] ...................................................... H04M 1/00
[52] U.S. Cl. ............................................ 379/433; 379/434
[58] Field of Search ..................................... 379/433, 428, 379/434, 419, 447; 455/90, 575; 320/43.01, 43.11, 43.22, 333

[56] References Cited

U.S. PATENT DOCUMENTS

| | | | |
|---|---|---|---|
| 4,912,602 | 3/1990 | Zurek et al. | 455/90 |
| 5,337,215 | 8/1994 | Sunderland et al. | 200/43.22 |

*Primary Examiner*—Jack Chiang
*Attorney, Agent, or Firm*—Bacon & Thomas, PLLC

[57] ABSTRACT

A battery holder adapted for attaching to a mobile telephone to provide it with battery power supply, the battery holder including a holder base holding a set of battery cells, a swivel hook member turned about an axis in an opening at one end of the holder base, the swivel hook member having a hooked portion adapted for hooking on a retaining hole on the mobile telephone to secure the battery holder and the mobile telephone together, a top cover covered on the holder base, and a spring element mounted between the top cover and the swivel hook member and adapted to force the hooked portion of the swivel hook member into engagement with the retaining hole on the mobile telephone.

2 Claims, 3 Drawing Sheets

BATTERY HOLDER

BACKGROUND OF THE INVENTION

The present invention relates to a battery holder for a mobile telephone, and more particularly to such a battery holder which can be quickly installed in the mobile telephone, and then conveniently removed from it when needed A regular battery holder for a mobile telephone generally comprises a hollow locating rod raised from the shell thereof, a cylindrical spring member mounted in the hollow locating rod, and lock means supported on the cylindrical spring member and adapted for securing the battery holder to the mobile telephone. This structure of battery holder has drawbacks. One drawback of this structure of battery holder is that the narrow portion of the shell around the hollow locating rod tends to be damaged due to frequent operation of the lock means. In order to eliminate this problem, the structure of narrow portion of the shell must be reinforced with a reinforcing metal plate. Another drawback of this structure of battery holder is the complicated procedure of mounting the cylindrical spring and the lock means in the hollow locating rod. Furthermore, it is not easy to positively lock the lock means.

SUMMARY OF THE INVENTION

The present invention provides a battery holder for a mobile telephone which eliminates the aforesaid drawbacks. The battery holder comprises a holder base having an opening at one end, two axle housings at two opposite sides of the opening, and two receiving portions below the axle housings; a swivel hook member mounted in the opening on the holder base and adapted to secure the holder base to the mobile telephone, the swivel hook member comprising a transverse pivot pin mounted in the axle housings for permitting the swivel hook member to be turned in the opening on the holder base, a press portion at the top through which the swivel hook member can be turned in the opening on the holder base with the hand, two stop blocks respectively received in the receiving portions of the holder base to limit the turning angle of the swivel hook member, and a hooked portion raised from the back and adapted for hooking on a retaining hole on the mobile telephone; a top cover covered on the holder base, the top cover having a stop edge adapted to stop said transverse pivot pin of the swivel hook member in the axle housings; and a spring element mounted between the swivel hook member and the top cover and adapted to force the hooked portion of the swivel hook member into engagement with the retaining hole on the mobile telephone.

DETAILED DESCRIPTION OF THE PREFERRED EMBODIMENT

Figure 1:
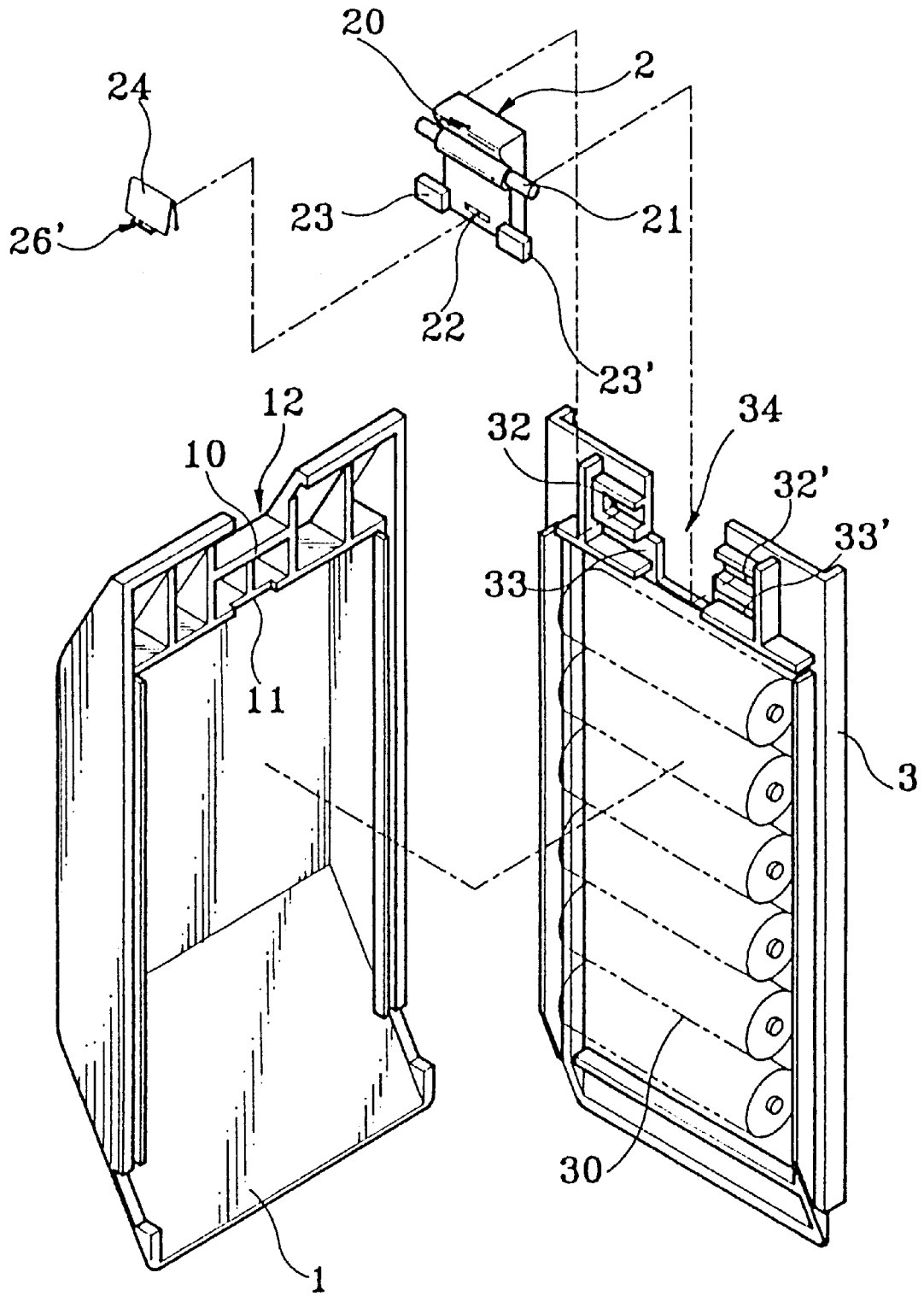
FIG. 1 is an exploded view of a battery holder according to the present invention.
Figure 2A:
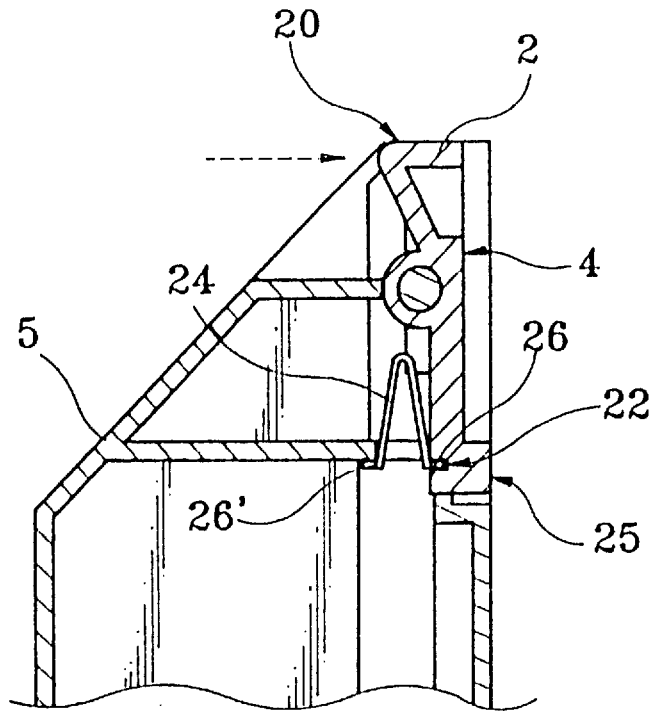
FIG. 2A is a sectional view of a part of the present invention, showing the top cover covered on the holder base, the spring element mounted between the top cover and the swivel hook member.

Referring to FIGS. 1 and 2A, a battery holder 5 is shown comprised of a top cover 1, a swivel hook member 2, a holder base 3 holding a set of dry battery cells 30, and a spring element 24.

The holder base 3 comprises an opening 34 at one end, two axle housings 32;32' at two opposite sides of the opening 34, and two receiving portions 33;33' at two opposite sides of the opening 34 below the axle housings 32;32'. The swivel hook member 2 is mounted in the opening 34 on the holder base 3, comprising a transverse pivot pin 21 mounted in the axle housings 32;32' for permitting the swivel hook member 2 to be turned therein, a press portion 20 at the top through which the swivel hook member 2 can be turned with the hand, two stop blocks 23;23' disposed in parallel to the pivot pins 21 at a bottom side which are respectively received in the receiving portions 33;33' of the holder base 3 to stop the swivel hook member 2 from turning forwards, a retaining groove 22 at a front side thereof between the stop blocks 23;23', and a hooked portion 25 raised from a back side thereof. The top cover 1 is covered on the holder base 3, having an opening 12 at one end corresponding to the opening 34 on the holder base 3, a stop edge 10 disposed at the bottom side of the opening 34 and adapted to stop the transverse pivot pin 21 of the swivel hook member 2 in the axle housings 32;32', and a retaining notch 11. The spring element 24 is stopped between the swivel hook member 2 and the top cover 1, having two opposite end pieces 26;26' respectively fastened to the retaining groove 22 on the swivel hook member 2 and the retaining notch 11 on the top cover 1. The spring element 24 imparts a pressure to the swivel hook member 2, causing the hooked portion 25 of the swivel hook member 2 to be forced out of the back side of the holder base 3.

Figure 2B:
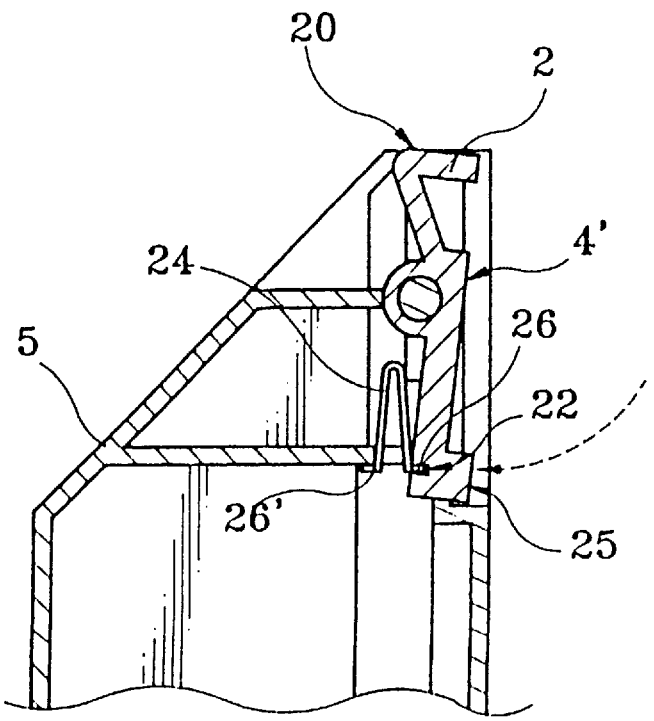
FIG. 2B is a sectional view showing the swivel hook member turned from the first position to the second position.
Figure 3:
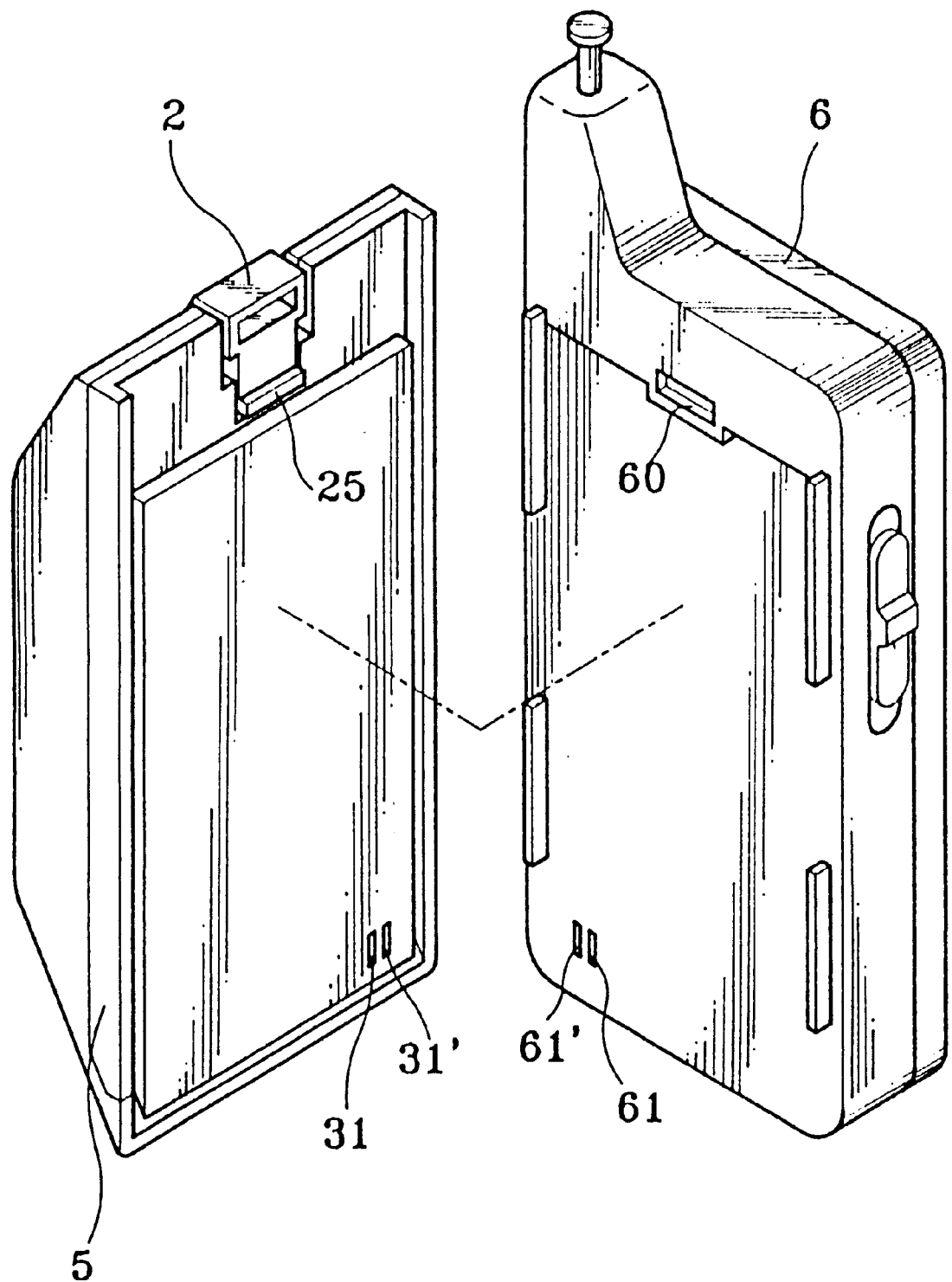
FIG. 3 shows the relationship between the battery holder and the mobile telephone according to the present invention.

Referring to FIGS. 2A, 2B and 3, when the battery holder 5 is attached to the mobile telephone 6, the power output contacts 31;31' on the battery holder 5 are respectively disposed in contact with the power input contacts 61;61' on the mobile telephone 6, and the hooked portion 25 of the swivel hook member 2 is forced by the spring element 24 into engagement with a retaining hole 60 on the mobile telephone 6, and therefore the battery holder 5 and the mobile telephone 6 are firmly retained together. When pressing the press portion 20 of the swivel hook member 2 with the hand to turn the swivel hook member 2 from the position 4 shown in FIG. 2A to the position 4' shown in FIG. 2B, the hooked portion 25 of the swivel hook member 2 is disengaged from the retaining hole 60 on the mobile telephone 6, and the battery holder 5 can thus be removed from the mobile telephone 6. After the battery holder 5 has been disconnected from the mobile telephone 6, the swivel hook member 2 is immediately forced by the spring element 24 back from the position 4' shown in FIG. 2B to the position 4 shown in FIG. 2A.

What the invention claimed is:

1. A battery holder adapted for attaching to a mobile telephone to provide it with battery power supply, comprising:

a holder base having an opening at one end, two axle housings at two opposite sides of the opening on said holder base, and two receiving portions at two opposite sides of the opening on said holder base below said axle housings;

a swivel hook member mounted in the opening on said holder base and adapted to secure said holder base to the mobile telephone, said swivel hook member comprising a transverse pivot pin mounted in said axle housings of said holder base for permitting the swivel hook member to be turned in the opening on said holder base, a press portion at a top side thereof through which said swivel hook member can be turned in the opening on said holder base with the hand, two stop blocks respectively received in said receiving portions of said holder base to limit the turning angle of said swivel hook member in the opening on said holder base, and a hooked portion raised from a back side thereof and adapted for hooking on a retaining hole on the mobile telephone;

a top cover covered on said holder base, said top cover having an opening at one end corresponding to the opening on said holder base, a stop edge adapted to stop said transverse pivot pin of said swivel hook member in said axle housings; and a spring element mounted between said swivel hook member and said top cover, said spring element imparting a pressure to said swivel hook member, causing said hooked portion of said swivel hook member to be forced into engagement with the retaining hole on the mobile telephone.

2. The battery holder of claim 1, wherein said swivel hook member has a retaining groove at a front side thereof; said top cover has a retaining notch adjacent the opening on said top cover; said spring element has two end pieces respectively fastened to the retaining groove on said swivel hook member and the retaining notch on said top cover.

* * * * *